Sept. 15, 1970            G. MANEVY            3,528,294

APPARATUS FOR TAKING SAMPLES OF POWDER

Filed July 30, 1968

United States Patent Office 3,528,294
Patented Sept. 15, 1970

3,528,294
APPARATUS FOR TAKING SAMPLES OF POWDER
Georges Manevy, Antony, France, assignor to Commissariat a l'Energie Atomique, Paris, France
Filed July 30, 1968, Ser. No. 748,877
Int. Cl. G01n 1/00
U.S. Cl. 73—421
2 Claims

ABSTRACT OF THE DISCLOSURE

An apparatus adapted to be connected to a vessel for taking samples of the powdered contents of the vessel. A cylindrical shell is connected to the vessel and encloses a branched collector tube in communication with a sample flask. The sample is taken by inverting the assembly so that powder runs into the apparatus whereupon the sample is separated, returning the assembly to its original position to return the unsampled powder to the vessel.

---

This invention relates to an apparatus for taking samples of powder, this term being employed to designate any material in the form of a solid in a subdivided state such as finely-divided dry particles, granular particles, flakes and the like. The design function of the apparatus is to obtain a representative sample from a mass of powder contained in a vessel, the quantity of powder constituting the sample being only a small fraction of the quantity of powder which is present in the vessel.

Many types of apparatus for taking samples of powder are already in existence. A number of these devices cannot be employed when the powder exhibits one or more of the following properties which are frequently met with, especially in the nuclear energy field: high radioactivity, chemical noxiousness, granulometric and chemical heterogeneity, high degrees of hardness which makes them difficult to comminute, insolubility in an aqueous solvent.

One type of sampling apparatus which is already known comprises within a cylindrical shell having a vertical axis a hollow collector tube which is coaxial with the shell and surmounted by a dispersion cone onto which the powder to be sampled is allowed to fall. The collector tube is provided with a plurality of oblique arms each having an open end portion for the purpose of collecting a fraction of the dispersed powder. This arrangement is subject to disadvantages in that the particles which fall onto the cone rebound differently according to their density and size and the arms accordingly collect some fractions in a selective manner. Furthermore, any larger objects which may be present in the powder to be sampled are liable to obstruct the openings of the arms.

The aim of this invention is to provide a sampling apparatus which meets practical requirements more satisfactorily than any comparable device which has been proposed up to the present time, especially insofar as it produces samples which are perfectly representative, irrespective of the nature and heterogeneity of the powder.

To this end, the invention proposes an apparatus for taking samples of a powder contained in a vessel and comprising:

a cylindrical shell;
a conical flange for connecting the vessel to one end of said shell and providing a communication passage which is coaxial with the shell and which is substantially smaller in diameter than said shell;
a collector tube which is coaxial with the shell and provided opposite to said passage with a conical head for the purpose of dispersing the powder which is admitted through said passage;
means for closing the other end of the shell and retaining a sample-receiving flask in a position in which said flask is coupled to the collector tube; and
a plurality of troughs which are inclined at equal angles to the axis of the shell and open into the interior of said shell at their lower ends, said troughs being adapted to collect a fraction of the powder when the shell which is connected to a vessel filled with powder is placed in the vertical position and when the powder falls under gravity onto the conical head and is dispersed by said head.

Among the other advantages of this apparatus, the following are particularly worthy of note: The apparatus does not comprise any moving portion and does not rely upon any driving fluid for its operation; it is of small overall size; it can be remote-controlled without difficulty; it prevents any contamination by dust particles; and any unsampled fractions of products can be returned as samples into the initial storage container by means of a simple pivotal movement.

One method of carrying out the invention will now be described by way of example and not in any sense by way of limitation, reference being made to the accompanying drawings, in which.

Figure 1:
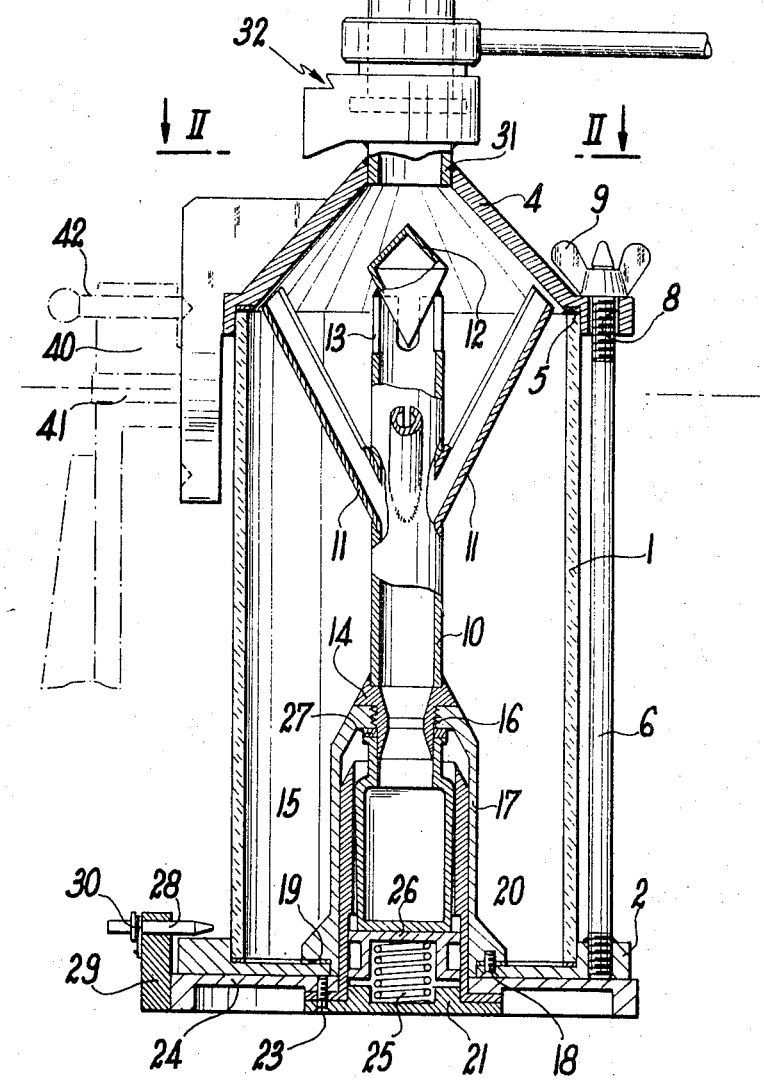
FIG. 1 is a view of the apparatus and of the supply vessel which is attached thereto, the view of the apparatus being taken in cross-section along the line I—I of FIG. 2.
Figure 2:
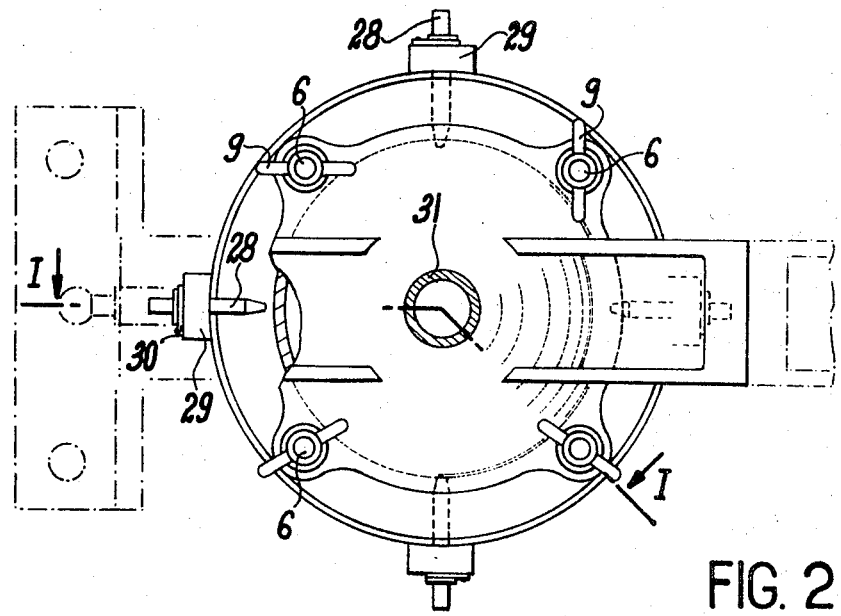
FIG. 2 is a top view of the sampling apparatus, this view being taken in cross-section along the line II—II of FIG. 1.

The apparatus which is shown in FIGS. 1 and 2 comprises a cylindrical body or shell 1 which is preferably made of transparent material. The lower end of the shell 1 is closed by a flange 2, leak-tightness being ensured by means of a circular seal which is not shown in the figure. The top portion of the shell is fitted with a conical flange 4. A circular seal 5 ensures leak-tightness of the joint between the shell and the flange 4. The flanges are secured by means of four threaded rods 6, the lower ends of which are screwed into four threaded bores 7 which are spaced over a circumference of the flange 2, then welded to said flange. Each rod 6 is passed through a bore 8 formed in the flange 4 and is provided with a wing nut 9 which is screwed onto said rod so as to compress the seals between the shell 1 and the flanges 2 and 4.

There is placed inside the shell 1 and coaxially with this latter a tube 10 into which open four troughs 11, said troughs being inclined at an angle of 60° with respect to each other and terminating in proximity to the conical flange 4. Said troughs are constituted by tubes which are split along their top generator-lines, the width of each split being distinctly smaller than the diameter of the tube but considerable greater than the maximum diameter of the grains of the mixture to be sampled. In the case of powder grains which do not exceed 1 mm. in diameter, tubes having an external diameter of 20 mm. and a width of slit of 5 mm. can be adopted. This arrangement has an advantage in that the admission of the fraction which constitutes the sample is not obstructed if the powder to be sampled contains objects of larger diameter (such as grinding balls, for example): such objects cannot obstruct the slit and therefore fall through.

A dispersing member 12 having a conical head is mounted above the tube 10. Elongated slots 13 are formed in the tube 10 beneath the member 12 and permit air to escape from the tube 10. The lower end of the tube 10 is welded to a junction piece 14 which connects the tube 10 to a detachable flask 15 formed of glass, for example. The junction piece 14 is provided with a screw-thread 16 onto which is screwed a support 17 of generally cylindrical shape. The lower portion of the support 17 is adapted to fit in a central hole of the flange 2 and is secured to the flange by means of four screws 18 which serve to clamp a seal 19 between the support 17 and the flange 2. The support 17 contains a tubular guide 20 which serves to maintain the flask 15 laterally. Said guide 20 passes through the central hole of the flange 2. The lower end of the guide is attached to a closure plate 21 by means of four screws 23 which also serve to secure the two members 20 and 21 to a support base 24 on which the flange 2 rests. Tightening of the screws 23 results in compression of a spring 25 which is applied within a cavity of the member 21 between this latter and a spacer plate 26 which is slidably fitted within a guide 20 and on which the vessel 15 is intended to rest. The neck of the flask 15 is then forced by the spring towards the internal surface of the connector 17 and applied against this latter with interposition of a seal 27.

The flange 2 and the base 24 are clamped together by means of four locking-pins 28 which are adapted to slide axially within four brackets 29 and are connected to said brackets by means of restoring and locking springs 30. The brackets 29 are secured to the base 24 by means of screws which are not shown in the figure.

The conical flange 4 terminates at the upper extremity in a stub pipe 31 and this latter is fitted with one of the components of a detachable conenctor 32 which can be of the type described in French Pat. No. 1,260,697. A vessel 33 which contains the powder to be sampled is intended to be fastened to said conical flange by means of the other component of the connector.

Means are provided whereby the apparatus can be rotated from the orientation in which it is shown in FIG. 1 to the opposite orientation. The means referred to can be of the type shown diagrammatically in chain-dotted lines in FIGS. 1–2 and can be constituted by a fixed bearing-bracket 40 and trunnions 41 which are rotatably mounted in said bearing-bracket and are rigidly fixed to the shell 1. A locking-pin 42 can be provided for the purpose of retaining the apparatus elastically in either of its two opposite orientations.

Figure 3A:
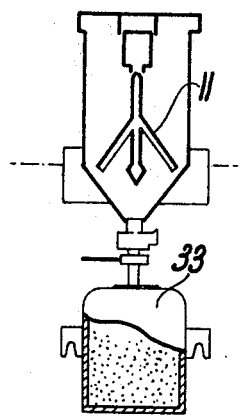
FIGS. 3a, 3b and 3c are operating diagrams of the apparatus.
Figure 3B:
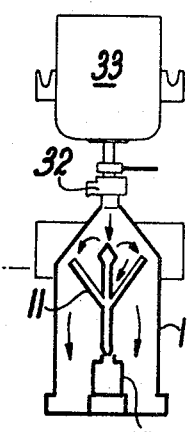
Figure 3C:
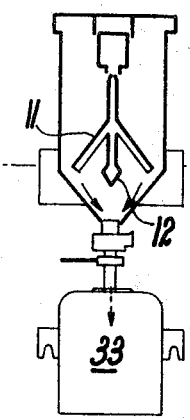

The operation of the apparatus is apparent from FIGS. 3a, 3b, 3c in which three successive positions are shown diagrammatically: In position A of FIG. 3a, the vessel 33 which is filled with powder to be sampled is coupled to the shell 1 by means of the connector 32. The complete assembly is then rotated through an angle of 180° in order to be brought to the orientation shown in FIG. 3b. Thus, the powder contained in the vessel 33 passes through the inlet pipe 31, is discharged onto the dispersing cone 12 and then divided, a fraction being collected in the flask 15 by way of the troughs 11. The flask 15 is removed for analysis of the sampled powder, the opening of the junction piece 14 is sealed by means of a suitable plug. The apparatus is again rotated through 180° and comes into position C, whereupon the powder which has not been sampled returns into the vessel 33.

By way of non-limitative example, said apparatus has been employed for the purpose of sampling the solid products derived from the processing of irradiated fuels comprising:

a fluidized bed for dissolving the fuel and a filtration bed, both beds being made up of corundum of very variable particle size,
a bed derived from a pyrohydrolysis reactor and consisting of ordinary sand and zirconia or alumina fines,
beds of sodium fluoride pellets and of activated alumina.

In this specific example of utilization, provision is made for four troughs constituted by tubes, a longitudinal slit having a width of 0.5 cm. being formed along the top of each tube. The internal diameter of the apparatus was 20 cm., the diameter at the base of the dispersion cone was 5.7 cm. and the theoretical sampling ratio was approximately 5%. The results obtained showed good reproducibility of sampling in spite of the diversity of particle sizes; in particular, the particle size distribution of the sampled fractions corresponded to the real value.

What I claim is:
1. An apparatus for taking samples of a powder contained in a vessel and comprising:
    a cylindrical shell;
    a conical flange for connecting the vessel to one end of said shell and providing a communication passage which is coaxial with the shell and which is substantially smaller in diameter than said shell;
    a collector tube which is coaxial with the shell and provided opposite to said passage with a conical head for dispersing the powder which is admitted through said passage;
    means for closing the other end of the shell and for retaining a sample-receiving flask in a position in which said flask is coupled to the collecor tube; and
    a plurality of troughs which are inclined at equal angles to the axis of the shell and open into the interior of said collector tube at their lower ends, said troughs being adapted to collect a fraction of the powder when the shell which is connected to a vessel filled with powder is placed in the vertical position and when the powder falls under gravity onto the conical head and is dispersed by said head.
2. An apparatus in accordance with claim 1, wherein each trough is constituted by a tube which is split along the top generator-line thereof, the width of the split being substantially smaller than the diameter of the tube but substantially greater than the maximum diameter of the grains of the mixture to be sampled.

References Cited
UNITED STATES PATENTS

| | | | |
|---|---|---|---|
| 1,160,036 | 11/1915 | Boerner | 73—421 |
| 2,379,921 | 7/1945 | Pizzirani | 73—421 |

FOREIGN PATENTS 27,091  11/1964  Germany.

S. CLEMENT SWISHER, Primary Examiner